United States Patent [19]

Wildhaber

[11] 4,044,571

[45] Aug. 30, 1977

[54] FLEXING-DISK COUPLING

[76] Inventor: Ernest Wildhaber, 124 Summit Drive, Rochester, N.Y. 14620

[21] Appl. No.: 695,205

[22] Filed: June 11, 1976

[51] Int. Cl.² ................................................ F16D 3/78
[52] U.S. Cl. ...................................... 64/13, 64/15 B; 64/27 L
[58] Field of Search .................... 64/13, 12, 14, 15 B, 64/27 B, 27 L

[56] References Cited

U.S. PATENT DOCUMENTS

| 2,363,257 | 11/1944 | Matteocci | 64/27 L |
|---|---|---|---|
| 3,041,857 | 7/1962 | Anderson et al. | 64/13 |
| 3,808,837 | 5/1974 | Anderson et al. | 64/13 |
| 3,988,907 | 11/1976 | Bohn et al. | 64/13 |

Primary Examiner—Samuel Scott
Assistant Examiner—Randall Heald

[57] ABSTRACT

The present invention relates to Flexing-Disk Couplings that permit moderate angular and axial displacements between two rotating parts connected thereby. They contain a plurality of adjacent disks operating in parallel. Each disk transmits only a portion of the total torque. To keep the several disks acting in a similar manner, their outer ends at least are connected with one of said parts through yielding rubber-like layers, permitting said disks to slightly move out or in relatively to each other. This avoids high stresses when said parts tilt with respect to each other. The use of several disks in parallel permits to increase the load capacity or reduce the coupling diameter and weight.

5 Claims, 9 Drawing Figures

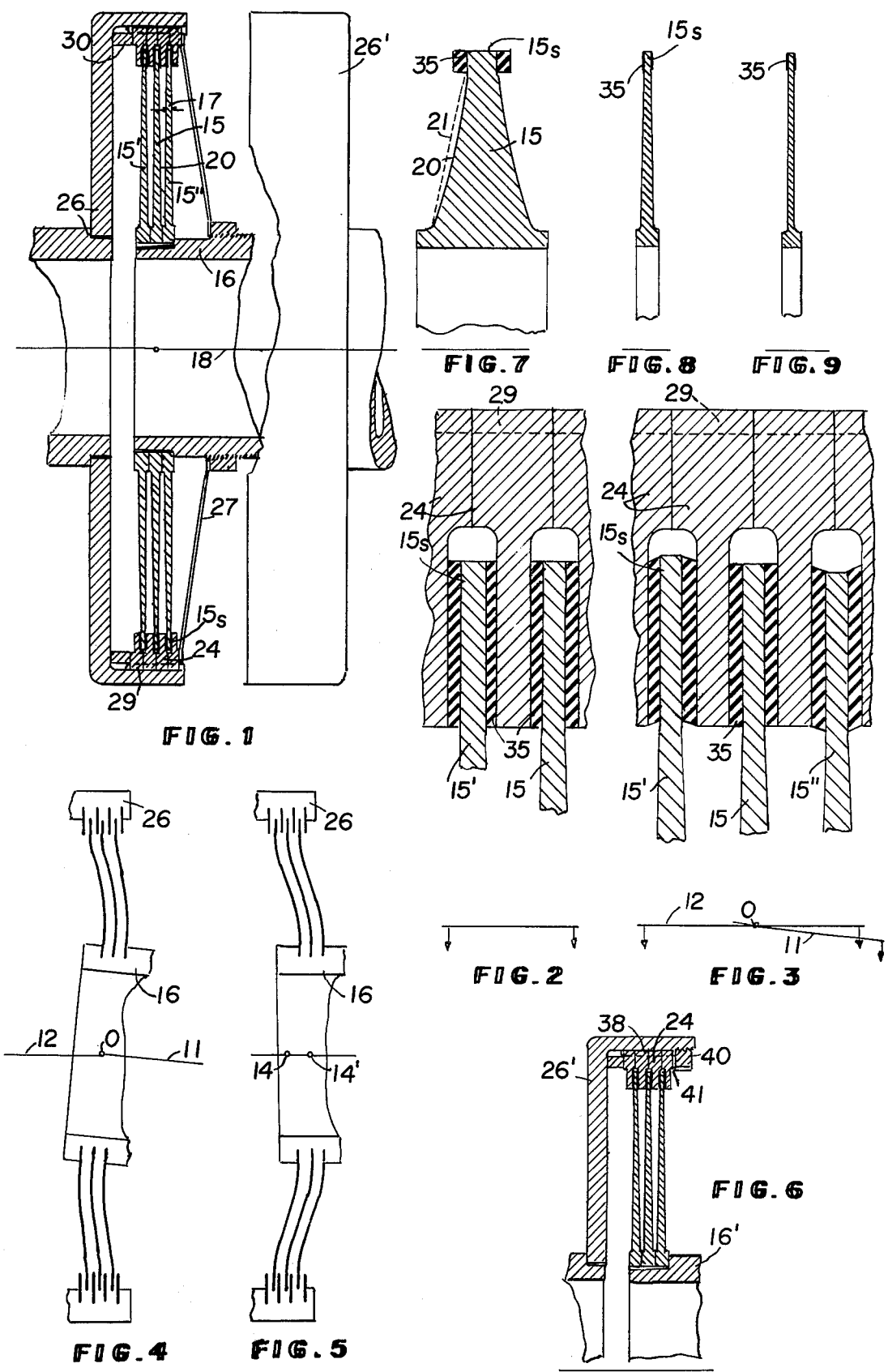

FLEXING-DISK COUPLING

The invention will be described with the accompanying drawings, in which

FIG. 1 is an axial section of a flexing-disk coupling constructed according to the present invention, with the shafts 18 connected thereby shown in alignment.

FIG. 2 is a fragmentary axial section at a larger scale, showing the radially-yielding connection of the outer disk portions. These are connected through rubber-like layers with intermediate rings ridig with one of the two parts connected by the coupling. Here the axes of the two parts are in alignment. They are at a large distance from the shown portions, displaced in the direction of the arrows.

FIG. 3 is a similar Figure showing the (distant) axes intersecting at an exaggerated angle. The omitted inmost portions of the disks extend perpendicular to axis 11.

FIG. 4 is a diagrammatic axial section at a smaller scale, showing the axes 11, 12 of the two parts at an exaggerated angle, intersecting at 0. The flexing disks are here shown by their central surface only.

FIG. 5 is a similar diagram, showing the two parts coaxial, but with a relative axial displacement 14-14'.

FIG. 6 is a partial axial section of a coupling, showing a modified connection of the rings as compared with that shown in FIG. 1.

FIG. 7 is a partial axial section of a disk of FIG. 1, where however the horizontal dimension has been hugely enlarged to better show up the concavity of the disk profiles.

FIGS. 8 and 9 are partial axial disk sections with modified profiles. FIG. 8 shows a disk with straight profiles that converge towards the outside, so that the outside end has a smaller thickness than the inner portions. FIG. 9 shows a disk of constant small thickness. Such disks might be used in larger numbers in a coupling.

The disks shown may be used one in place of the other, using suitable thicknesses.

Returning to FIG. 1, the flexible disks are rigidly secured to part 16, or inner shaft member, in any known manner. In one embodiment they are welded to it. The disk thickness 17 decreases with increasing radial distance from their center. The profiles 20 are slightly concave, see FIG. 7, so that the intermediate profile stands back from the chord 21, that connects the end points of the portion of changing thickness. In one embodiment the disk thickness is inversely proportional to its distance from the disk center.

Adjacent their outer ends the disks contain each a straight portion 15s of constant thickness. Its thickness is equal to or close to the minimum thickness of the disk. Rings 24 reach between the disks adjacent the outer end thereof. They are bonded to the portions 15s by a flexible rubber-like layer of constant thickness. The rings 24 are connected with part 26 to transmit torque thereto. They may be provided with straight gear teeth 29 on their outside ends. These engage teeth internally provided on part 26, preferably with almost no backlash.

The rings 24 are kept in a fixed position axially of part 26. This may be accomplished by a conical disk-spring 27 that presses the rings against an insert 30, that itself is pressed against part 26.

The coupling may be used singly or usually in pairs. 26' represents a portion of the other coupling of the pair. It may be at any suitable distance from part 26.

I may use 2, 3, 4, 5 or more adjacent disks.

FIG. 2 shows the connection between the disks 15 and the rings 24 at a larger scale. They are bonded through sheets or layers of rubber-like flexible material to one another. The layers have a constant thickness and extend along planes perpendicular to the axis of part 26.

FIG. 3 shows up the conditions with tilted axes 11, 12 that intersect at 0. The outer ends of the disks 15', 15, 15" then follow a cylindrical surface whose axis coincides with axis 11 of part 16. Such radial displacement of the outer disk portions is permitted by the layers 35, without setting up additional stress peaks.

The displacement between adjacent disks is very small. At a disk spacing of 0.100 inches and an angle of one degree between the part axes, the radial displacement between adjacent disks is only 0.0017 inches. Thus there is very little motion between adjacent disks. But by permitting this minimal motion large bending stresses are avoided, that would exist with disks rigidly connected at both their inner and outer ends.

Diagram FIG. 4 illustrates, with exaggeration, the conditions where the axes of the two parts are tilted to each other and intersect at 0. Diagram FIG. 5 shows coaxial parts that are relatively shifted a distance 14-14' in axial direction. Other conditions are a combination of these two.

While FIG. 1 illustrates one way of rigidly connecting the rings 24 to part 26, FIG. 6 shows a modification. Here the rings 24, connected with gear teeth 38 to part 26', are pressed to the body of part 26' by a nut 40 internally threaded into part 26'. An elastic element 41 may be interposed between the nut and the adjacent ring, to keep the nut under constant pressure, to prevent looseness.

Other known ways may also be used to keep the rings 24 rigid with part 26'.

I claim:

1. A flexing-disk coupling for connecting two rotating parts, comprising a plurality of generally circular disks secured to one of said parts at their inner portion, said disks extending along parallel planes in proximity of each other when the axes of said parts coincide, the outer ends of said disks being connected to the other of said parts through radially yielding rubber-like layers, to permit said outer ends to relatively expand and contract radially in tilting, whereby each disk transmits only a nearly equal fraction of the total torque transmitted by the coupling, said disks being of metal to keep them torsionally stiff, whereby to minimize relative angular deflection about the coupling axis, said layers being confined to the outer end portions of said disks and having a thickness smaller than the average thickness of the working portion of said disks.

2. A flexing-disk coupling according to claim 1, wherein the profile of an axial section of said disks is slightly concave, so that intermediate disk-profile portions stand back of the chord that connects the outer and inner ends of said profile.

3. A flexing-disk coupling according to claim 1, wherein the outer ends of the disks are bonded through rubber-like layers to rings reaching between them, and means are provided to maintain said rings rigid with said other part.

4. A flexing-disk coupling according to claim 3, wherein said rings contain spur teeth provided on the outside thereof and engaging teeth provided internally on said other part.

5. A flexing-disk coupling according to claim 4, wherein a tapered disk spring keeps said rings pressed against said other part.

* * * * *